(12) United States Patent
Cheng et al.

(10) Patent No.: US 7,723,404 B2
(45) Date of Patent: May 25, 2010

(54) ABRASION RESISTANT COATING COMPOSITIONS AND COATED ARTICLES

(75) Inventors: Shan Cheng, Pittsburgh, PA (US); James P. Colton, Trafford, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 1084 days.

(21) Appl. No.: 11/399,146

(22) Filed: Apr. 6, 2006

(65) Prior Publication Data

US 2007/0237964 A1 Oct. 11, 2007

(51) Int. Cl.
*C03C 25/26* (2006.01)
*C08K 9/00* (2006.01)

(52) U.S. Cl. ........... 523/203; 106/287.1; 106/287.13; 106/287.14; 106/287.16; 523/200

(58) Field of Classification Search .......... 106/287.1, 106/287.14, 287.16, 287.13; 523/200, 203; 526/194
See application file for complete search history.

(56) References Cited

U.S. PATENT DOCUMENTS

| | | | | |
|---|---|---|---|---|
| 4,348,462 | A | 9/1982 | Chung | 428/412 |
| 4,753,827 | A | 6/1988 | Yoldas et al. | 427/387 |
| 4,754,012 | A | 6/1988 | Yoldas et al. | 528/10 |
| 5,035,745 | A | 7/1991 | Lin et al. | 106/287.16 |
| 5,086,087 | A | 2/1992 | Misev | 522/84 |
| 5,199,979 | A | 4/1993 | Lin et al. | 106/287.14 |
| 5,411,787 | A * | 5/1995 | Kulkarni et al. | 428/32.11 |
| 5,827,923 | A | 10/1998 | Medford et al. | 524/854 |
| 6,022,919 | A * | 2/2000 | Komoto et al. | 524/430 |
| 6,106,605 | A | 8/2000 | Basil et al. | 106/287.12 |
| 6,355,189 | B1 | 3/2002 | Basil et al. | 252/588 |
| 6,376,559 | B1 * | 4/2002 | Komoto et al. | 516/34 |
| 6,984,262 | B2 | 1/2006 | King et al. | 106/287.22 |
| 2002/0061407 | A1 | 5/2002 | Colton et al. | 428/447 |
| 2003/0187088 | A1 | 10/2003 | Yoshikawa et al. | 522/172 |
| 2005/0040562 | A1 * | 2/2005 | Steinmann et al. | 264/401 |

FOREIGN PATENT DOCUMENTS

| | | |
|---|---|---|
| EP | 0 383 074 A2 | 8/1990 |
| EP | 0 437 327 A2 | 7/1991 |
| EP | 0 336 474 B1 | 1/1993 |

OTHER PUBLICATIONS

U.S. Appl. No. 11/116,552, filed Apr. 28, 2005, of Shan Cheng et al., entitled "Hard Coat Compositions with Acid Functional Organosiloxane Polyol".
http://www.hanse-chemie.com/cms/front_content.php?idcatart=162&lang=1&client=1, Nanocryl—Uncompromising Scratch Resistance, Hanse Chemie AG, 2004 Accis Systemhaus Berlin.
http://www.hanse-chemie.com/cms/front_content.php?idcatart=191&lang=1&client=1, Modifying Radiation-Curing Coatings with Nanoparticles, Hanse Chemie AG, 2004 Accis Systemhaus Berlin.

* cited by examiner

*Primary Examiner*—David Wu
*Assistant Examiner*—Marie Reddick
(74) *Attorney, Agent, or Firm*—Donald R. Palladino

(57) ABSTRACT

Coating compositions are disclosed that include an alkoxide and a silica sol that includes silica nanoparticles and a polymerizable (meth)acrylate binding agent. The polymerizable (meth)acrylate binding agent remains substantially uncrosslinked after the coating composition has been cured to form a hard coat. Also disclosed are articles at least partially coated with a hard coat deposited from such a coating composition, methods for depositing a hard coat on at least a portion of a plastic substrate, and methods for improving the adhesion and abrasion resistance of a coating composition.

10 Claims, No Drawings

ABRASION RESISTANT COATING COMPOSITIONS AND COATED ARTICLES

FIELD OF THE INVENTION

The present invention relates to abrasion resistant coating compositions. More particularly, the present invention relates to abrasion resistant coating compositions that include a silica sol comprising silica nanoparticles dispersed in a polymerizable (meth)acrylate binding agent, wherein the polymerizable (meth)acrylate remains substantially uncrosslinked after the coating composition has been cured to form a hard coat. The coating compositions often exhibit good adhesion to organic substrates, such as polycarbonate, without the use of a primer.

BACKGROUND INFORMATION

Plastic substrates, including transparent plastic substrates, are desired for a number of applications, such as windshields, lenses, and consumer electronics, among other things. To minimize scratching, as well as other forms of degradation, clear "hard coats" are often applied as protective layers to the substrates. A primer is often used to enhance adhesion between the hardcoat and the substrate. Hard coats that adhere to these substrates without the use of a primer, while maintaining their abrasion resistance properties, are desired. In addition, hard coats that are rapidly curable upon exposure to actinic radiation are also desired for, among other reasons, productivity.

SUMMARY OF THE INVENTION

In certain respects, the present invention is directed to coating compositions comprising: (a) an alkoxide of the general formula $R_xM(OR')_{z-x}$ where R is an organic radical, M is silicon, aluminum, titanium, and/or zirconium, each R' is independently an alkyl radical, z is the valence of M, and x is a number less than z and may be zero; and (b) a silica sol comprising silica nanoparticles and a polymerizable (meth) acrylate binding agent. In these coating compositions the polymerizable (meth)acrylate binding agent remains substantially uncrosslinked after the coating composition has been cured to form a hard coat.

In other respects, the present invention is directed to an article at least partially coated with a hard coat. The hard coat is deposited from a coating composition comprising: (a) an alkoxide of the general formula $R_xM(OR')_{z-x}$ where R is an organic radical, M is silicon, aluminum, titanium, and/or zirconium, each R' is independently an alkyl radical, z is the valence of M, and x is a number less than z and may be zero; and (b) a silica sol comprising silica nanoparticles and a polymerizable (meth)acrylate binding agent. In these articles, the polymerizable (meth)acrylate binding agent in the hard coat is substantially uncrosslinked.

In yet other respects, the present invention is directed to methods for depositing a hard coat on at least a portion of a plastic substrate. These methods comprise: (a) at least partially hydrolyzing an alkoxide of the general formula $R_xM(OR')_{z-x}$ where R is an organic radical, M is silicon, aluminum, titanium, and/or zirconium, each R' is independently an alkyl radical, z is the valence of M, and x is a number less than z and may be zero; (b) adding a silica sol comprising silica nanoparticles and a polymerizable (meth)acrylate binding agent to the at least partially hydrolyzed alkoxide to form a coating composition; (c) depositing the coating composition on at least a portion of the substrate; and (d) curing the coating composition. In these embodiments, the polymerizable (meth)acrylate binding agent remains substantially uncrosslinked after the curing step.

In still other respects, the present invention is directed to methods for improving the adhesion and abrasion resistance of a coating composition. These methods comprise including in the coating composition a silica sol comprising silica nanoparticles and a polymerizable (meth)acrylate binding agent, wherein the polymerizable (meth)acrylate binding agent remains substantially uncrosslinked after the coating composition has been cured to form a hard coat.

DETAILED DESCRIPTION OF EMBODIMENTS OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. For example, and without limitation, this application refers to coating compositions that comprise "an alkoxide." Such references to "an alkoxide" is meant to encompass coating compositions comprising one alkoxide as well as coating compositions that comprise a mixture of two or more different alkoxides. In addition, in this application, the use of "or" means "and/or" unless specifically stated otherwise, even though "and/or" may be explicitly used in certain instances.

As indicated, certain embodiments of the present invention are directed to coating compositions, such as coating compositions suitable for producing a hard coat. As used herein, the term "hard coat" refers to a coating, such as a clear coat, that offers one or more of chip resistance, impact resistance, abrasion resistance, UV degradation resistance, humidity resistance, and/or chemical resistance.

In certain embodiments, the coating compositions of the present invention comprise an alkoxide of the general formula $R_xM(OR')_{z-x}$ where R is an organic radical, M is silicon, aluminum, titanium, and/or zirconium, each R' is independently an alkyl radical, z is the valence of M, and x is a number less than z and may be zero. Examples of suitable organic radicals include, but are not limited to, alkyl, vinyl, methoxyalkyl, phenyl, γ-glycidoxy propyl and γ-methacryloxy propyl. The alkoxide can be further mixed and/or reacted with other compounds and/or polymers known in the art. Particularly suitable are compositions comprising siloxanes formed from at least partially hydrolyzing an organoalkoxysilane, such as one within the formula above. Examples of suitable alkoxide-containing compounds and methods for making them are described in U.S. Pat. Nos. 6,355,189; 6,264,859; 6,469,119; 6,180,248; 5,916,686; 5,401,579; 4,799,963; 5,344,712; 4,731,264; 4,753,827; 4,754,012; 4,814,017; 5,115,023; 5,035,745; 5,231,156; 5,199,979; and 6,106,605, all of which are incorporated by reference herein.

In certain embodiments, the alkoxide comprises a combination of a glycidoxy[($C_1$-$C_3$)alkyl]tri($C_1$-$C_4$)alkoxysilane monomer and a tetra($C_1$-$C_6$)alkoxysilane monomer. Glycidoxy[($C_1$-$C_3$)alkyl]tri($C_1$-$C_4$)alkoxysilane monomers suitable for use in the coating compositions of the present invention include glycidoxymethyltriethoxysilane, α-glycidoxyethyltrimethoxysilane, α-glycidoxyethyl-triethoxysilane, β-glycidoxyethyltrimethoxysilane, β-glycidoxyethyl-triethoxysilane, α-glycidoxy-propyltrimethoxysilane, α-glycidoxypropyltriethoxysilane, β-glycidoxypro- pyltrimethoxysilane, β-glycidoxypropyl-triethoxysilane, γ-glycidoxypropyltrimethoxysilane, hydrolysates thereof, or mixtures of such silane monomers.

Suitable tetra($C_1$-$C_6$)alkoxysilanes that may be used in combination with the glycidoxy[($C_1$-$C_3$)alkyl]tri($C_1$-$C_4$) alkoxysilane in the coating compositions of the present invention include, for example, materials such as tetramethoxysilane, tetraethoxysilane, tetrapropoxysilane, tetrabutoxysilane, tetrapentyloxysilane, tetrahexyloxysilane and mixtures thereof.

In certain embodiments, the glycidoxy[($C_1$-$C_3$)alkyl]tri ($C_1$-$C_4$)alkoxysilane and tetra($C_1$-$C_6$)alkoxysilane monomers used in the coating composition of the present invention are present in a weight ratio of glycidoxy [($C_1$-$C_3$)alkyl]tri ($C_1$-$C_4$)alkoxysilane to tetra($C_1$-$C_6$)alkoxysilane of from 0.5:1 to 100:1, such as 0.75:1 to 50:1 and, in some cases, from 1:1 to 5:1.

In certain embodiments, the alkoxide (or combination of two or more thereof described above) is present in the coating composition in an amount of 5 to 75 percent by weight, such as 10 to 70 percent by weight, or, in some cases, 20 to 65 percent by weight, or, in yet other cases, 25 to 60 percent by weight, with the weight percent being based on the total weight of the composition.

In certain embodiments, the coating compositions of the present invention comprise a silica sol comprising silica nanoparticles and a polymerizable (meth)acrylate binding agent. As used herein, the term "silica sol" refers to a colloidal dispersion of finely divided silica particles dispersed in a binding agent, which, in the present invention comprises an polymerizable (meth)acrylate. As used herein, the term "silica" refers to $SiO_2$. As used herein, the term "nanoparticles" refers to particles that have an average primary particle size of less than 1 micron. In certain embodiments, the nanoparticles used in the present invention have an average primary particle size of 300 nanometers or less, such as 200 nanometers or less, or, in some cases, 100 nanometers or less, or, in yet other cases, 50 nanometers or less, or, in some cases, 20 nanometers or less.

For purposes of the present invention, average particle size can be measured according to known laser scattering techniques. For example, average particle size can be determined using a Horiba Model LA 900 laser diffraction particle size instrument, which uses a helium-neon laser with a wave length of 633 nm to measure the size of the particles and assumes the particle has a spherical shape, i.e., the "particle size" refers to the smallest sphere that will completely enclose the particle. Average particle size can also be determined by visually examining an electron micrograph of a transmission electron microscopy ("TEM") image of a representative sample of the particles, measuring the diameter of the particles in the image, and calculating the average primary particle size of the measured particles based on magnification of the TEM image. One of ordinary skill in the art will understand how to prepare such a TEM image and determine the primary particle size based on the magnification. The primary particle size of a particle refers to the smallest diameter sphere that will completely enclose the particle. As used herein, the term "primary particle size" refers to the size of an individual particle, as opposed to an agglomeration of particles.

As indicated, the silica sol comprises a polymerizable (meth)acrylate binding agent. As used herein, the term "(meth)acrylate" is meant to include both acrylate and methacrylate. Polymerizable (meth)acrylates suitable for use as a binding agent in the silica sols present in the coating compositions of the present invention include unsaturated (meth) acrylate monomers and oligomers, such as, for example, mono-, di-, tri-, tetra-, and penta-(meth)acrylates. Non-limiting specific examples of such materials include hydroxyethylmethacrylate, trimethylolpropaneformalacrylate, hexanedioldiacrylate, tripropyleneglycoldiacrylate, neopentylglycoldiacrylate, trimethylolpropanetriacrylate, glycerintriacrylate, and/or pentaerythritoltetraacrylate, among others.

Silica sols suitable for use in the present invention are commercially available. Examples include the Nanocryl® line of products available from Hanse Chemie AG, Geesthacht, Germany. These products are low viscosity sols having a silica content of up to 50 percent by weight.

In certain embodiments, the silica sol further comprises an organic solvent. Suitable organic solvents are those that will stabilize the silica sol in the coating composition. The minimum amount of solvent present in the coating composition is a solvating amount, i.e., an amount which is sufficient to solubilize or disperse the silica sol in the coating composition. For example, the amount of solvent present may range from 20 to 90 weight percent based on the total weight of the coating composition. Suitable solvents include, but are not limited to, the following: benzene, toluene, methyl ethyl ketone, methyl isobutyl ketone, acetone, ethanol, tetrahydrofurfuryl alcohol, propyl alcohol, propylene carbonate, N-methylpyrrolidinone, N-vinylpyrrolidinone, N-acetylpyrrolidinone, N-hydroxymethylpyrrolidinone, N-butyl-pyrrolidinone, N-ethylpyrrolidinone, N—(N-octyl)-pyrrolidinone, N-(n-dodecyl)pyrrolidinone, 2-methoxyethyl ether, xylene, cyclohexane, 3-methylcyclohexanone, ethyl acetate, butyl acetate, tetrahydrofuran, methanol, amyl propionate, methyl propionate, diethylene glycol monobutyl ether, dimethyl sulfoxide, dimethyl formamide, ethylene glycol, mono- and dialkyl ethers of ethylene glycol and their derivatives, which are sold as CELLOSOLVE industrial solvents by Union Carbide, propylene glycol methyl ether and propylene glycol methyl ether acetate, which are sold as DOWANOL® PM and PMA solvents, respectively, by Dow Chemical and mixtures of such recited solvents As a result, in certain embodiments, such as where the silica sol is one of the commercially available Nanocryl® silica sols described above, the silica sol is first diluted with an organic solvent prior to combining the silica sol with an at least partially hydrolyzed alkoxide of the type described herein.

In certain embodiments, the silica sol is present in the coating composition in an amount of 1 to 20 percent by weight, such as 5 to 15 percent by weight, with the weight percents being based on the total weight of the composition.

In certain embodiments, the alkoxide is at least partially hydrolyzed before combination with the silica sol. Such an hydrolysis reaction is described in U.S. Pat. No. 6,355,189 at col. 3, lines 7 to 28, the cited portion of which being incorporated by reference herein.

In certain embodiments, water is provided in an amount necessary for the hydrolysis of the hydrolyzable alkoxide(s). For example, in certain embodiments, water is present in an amount of at least 1.5 moles of water per mole of hydrolyzable alkoxide. In certain embodiments, atmospheric moisture, if sufficient, can be adequate.

In certain embodiments, a catalyst is provided to catalyze the hydrolysis and condensation reaction. In certain embodiments, the catalyst is an acidic material and/or a material, different from the acidic material, which generates an acid upon exposure to actinic radiation. In certain embodiments, the acidic material is chosen from an organic acid, inorganic acid or mixture thereof. Non-limiting examples of such materials include acetic, formic, glutaric, maleic, nitric, hydrochloric, phosphoric, hydrofluoric, sulfuric acid or mixtures thereof.

Any material that generates an acid on exposure to actinic radiation can be used as a hydrolysis and condensation catalyst in the coating compositions of the present invention, such as a Lewis acid and/or a Bronsted acid. Non-limiting examples of acid generating compounds include onium salts and iodosyl salts, aromatic diazonium salts, metallocenium salts, o-nitrobenzaldehyde, the polyoxymethylene polymers described in U.S. Pat. No. 3,991,033, the o-nitrocarbinol esters described in U.S. Pat. No. 3,849,137, the o-nitrophenyl acetals, their polyesters and end-capped derivatives described in U.S. Pat. No. 4,086,210, sulphonate esters or aromatic alcohols containing a carbonyl group in a position alpha or beta to the sulphonate ester group, N-sulphonyloxy derivatives of an aromatic amide or imide, aromatic oxime sulphonates, quinone diazides, and resins containing benzoin groups in the chain, such as those described in U.S. Pat. No. 4,368,253. Examples of these radiation activated acid catalysts are also disclosed in U.S. Pat. No. 5,451,345.

In certain embodiments, the acid generating compound is a cationic photoinitiator, such as an onium salt. Non-limiting examples of such materials include diaryliodonium salts and triarylsulfonium salts, which are commercially available as SarCat® CD-1012 and CD-1011 from Sartomer Company. Other suitable onium salts are described in U.S. Pat. No. 5,639,802, column 8, line 59 to column 10, line 46. Examples of such onium salts include 4,4'-dimethyldiphenyliodonium tetrafluoroborate, phenyl-4-octyloxyphenyl phenyliodonium hexafluoroantimonate, dodecyldiphenyl iodonium hexafluoroantimonate, [4-[(2-tetradecanol)oxy]phenyl]phenyl iodonium hexafluoroantimonate and mixtures thereof.

The amount of catalyst used in the coating compositions of the present invention can vary widely and depend on the particular materials used. Only the amount required to catalyze and/or initiate the hydrolysis and condensation reaction is required, e.g., a catalyzing amount. In certain embodiments, the acidic material and/or acid generating material can be used in an amount from 0.01 to 5 percent by weight, based on the total weight of the composition.

In certain embodiments, the coating compositions of the present invention include other additive materials, such as tints or colorants and/or photochromic compounds, including those described in U.S. Patent Application Publication 2002/00651407 at [0051] to [0056], the cited portion of which being incorporated herein by reference.

The coating compositions of the present invention can also include one or more standard additives, such as flow additives, rheology modifiers, adhesion promoters, and the like. In certain embodiments, the coating compositions of the present invention comprise a UV absorber.

In certain embodiments, the coating compositions of the present invention comprise an organosiloxane polyol of the type described in U.S. patent application Ser. No. 11/116,552 at [0004] to [0007], the cited portion of which being incorporated herein by reference. Such a material, if used, is often present in the coating composition in an amount of 1 to 25 weight percent, such as 2 to 15 or 5 to 10 weight percent, based on the total solid weight of the coating composition.

In certain embodiments, the coating compositions of the present invention are, aside from the materials introduced to the coating composition as part of the silica sol, substantially free of, or, in some cases, completely free of any free radically polymerizable material. Examples of such materials are mono-, di-, tri-, tetra- or pentafunctional monomeric or oligomeric aliphatic, cycloaliphatic or aromatic (meth)acrylates. As used herein, the term "substantially free" means that the material being discussed is present in the composition, if at all, as an incidental impurity. In other words, the material does not affect the properties of the composition. As used herein, the term "completely free" means that the material is not present in the composition at all.

In certain embodiments, the coating compositions of the present invention are substantially free of, or, in some cases, completely free of any free radical polymerization initiators. Such materials include any compound that forms free radicals upon exposure to actinic radiation. Specific examples of such materials, which, in certain embodiments, are substantially or completely absent from the coating compositions of the present invention, are benzoins, benzil, benzil ketals, anthraquinones, thioxanthones, xanthones, acridine derivatives, phenazene derivatives, quinoxaline derivatives, 1-phenyl-1,2-propanedione-2-O-benzoyloxime, 1-aminophenyl ketones, 1-hydroxyphenyl ketones, and triazine compounds. Other free radical polymerization initiators, which, in certain embodiments, are substantially or completely absent from the coating compositions of the present invention are acetophenones, benzil ketals and benzoylphosphine oxides. Another class of free radical polymerization initiators, which, in certain embodiments, are substantially or completely absent from the coating compositions of the present invention are the ionic dye-counter ion compounds, which are capable of absorbing actinic rays and producing free radicals, such as the materials described in published European-patent application EP 223587 and U.S. Pat. Nos. 4,751,102; 4,772,530 and 4,772,541. As a result, certain embodiments of the present invention include no more than 1 percent by weight, or, in some cases, no more than 0.5 percent by weight, or, in yet other cases, no more than 0.1 percent by weight of free radical polymerization initiator, with weight percents being based on the total weight of the coating composition.

The coating compositions of the present invention can be prepared by any suitable method and the Examples herein illustrate one such method. For example, the coating compositions can be prepared by at least partially hydrolyzing the alkoxide described above and then adding the silica sol to the at least partially hydrolyzed material.

The coating compositions of the present invention can be applied to any suitable substrate, however, in many cases, the substrate is a plastic substrate, such as thermoplastic substrate, including, but not limited to, polycarbonate, acrylonitrile butadiene styrene, blends of polyphenylene ether and polystyrene, polyetherimide, polyester, polysulfone, acrylic, and copolymers and/or blends thereof.

Prior to applying the coating composition to such a substrate, the substrate surface may be treated by cleaning. Effective treatment techniques for plastics include ultrasonic cleaning; washing with an aqueous mixture of organic solvent, e.g., a 50:50 mixture of isopropanol:water or ethanol:water; UV treatment; activated gas treatment, e.g., treatment with low temperature plasma or corona discharge, and chemical treatment such as hydroxylation, i.e., etching of the surface with an aqueous solution of alkali, e.g., sodium hydroxide or potassium hydroxide, that may also contain a fluorosurfactant. See U.S. Pat. No. 3,971,872, column 3, lines 13 to 25; U.S. Pat. No. 4,904,525, column 6, lines 10 to 48; and U.S. Pat. No. 5,104,692, column 13, lines 10 to 59, which describe surface treatments of polymeric organic materials.

The coating compositions of the present invention may be applied to the substrate using, for example, any conventional coating technique including flow coating, dip coating, spin coating, roll coating, curtain coating and spray coating. Application of the coating composition to the substrate may, if desired, be done in an environment that is substantially free of dust or contaminants, e.g., a clean room. Coatings prepared by the process of the present invention may range in thickness from 0.1 to 50 microns (μm), such as from 2 to 20 μm, and, in some cases, from 2 to 10 μm, e.g., 5 μm.

Following application of a coating composition of the present invention to the substrate, the coating is cured, such as by flashing the coating at ambient temperature for up to one hour, and then baking the coating at an appropriate temperature and time, which can be determined by one skilled in the art based upon the particular coating and/or substrate being used. As used herein, the terms "cured" and "curing" refer to the at least partial crosslinking of the components of the coating that are intended to be cured, i.e., cross-linked. In certain embodiments, the crosslink density, i.e., the degree of crosslinking, ranges from 35 to 100 percent of complete crosslinking. The presence and degree of crosslinking, i.e., the crosslink density, can be determined by a variety of methods, such as dynamic mechanical thermal analysis (DMTA) using a Polymer Laboratories MK III DMTA analyzer, as is described in U.S. Pat. No. 6,803,408, at col. 7, line 66 to col. 8, line 18, the cited portion of which being incorporated herein by reference.

In certain embodiments, when a material that generates an acid on exposure to actinic radiation is present in a coating composition of the present invention, as described above, the coating composition may be at least partially cured by irradiating the coated substrate with a curing amount of ultraviolet light, either after thermally curing the coating, simultaneously during a thermal curing process, or in lieu of a thermal curing process. During the irradiation step, the coated substrate may be maintained at room temperature, e.g., 22° C., or it may be heated to an elevated temperature which is below the temperature at which damage to the substrate occurs.

One feature of certain embodiments of the coating compositions of the present invention is that the polymerizable (meth)acrylate binding agent present in the silica sol remains substantially uncrosslinked after the coating composition has been cured to form a hard coat, i.e., after the previously described curing step which cures the hardcoat resin matrix. As used herein, the term "substantially uncrosslinked" means that upon cure of the coating composition to form a hard coat, the polymerizable (meth)acrylate has not reacted with itself or other composition components to an extent that the adhesion of the resultant hard coat on a polycarbonate substrate is negatively impacted, i.e., the hard coat exhibits a reduced adhesion rating, when measured as described below.

In certain embodiments, the coating compositions of the present invention exhibit improved adhesion to polycarbonate substrates, without the use of a primer, while maintaining and, in some cases, significantly improving the abrasion resistance of the resulting coating as compared to a similar coating that does not comprise the silica sol described herein. For purposes of the present invention, abrasion resistance is measured in accordance with a standard Taber Abrasion Test (ANSI/SAE 26.1-1996), with % haze being measured after 300 taber abrasion cycles. For purposes of the present invention, the abrasion resistance of a coating is "improved" relative to another coating if the % haze of the coating after 300 taber abrasion cycles is lower than the coating to which it is being compared. Adhesion, for purposes of the present invention, is measured using a Crosshatch adhesion test, wherein a multi-blade cutter (Paul N. Gardner Company, Inc.) is used. In particular, a coated panel is scribed twice (at 90°), making sure the blades cut into the substrate. Coating adhesion is measured using Nichiban LP-24 tape (one pull adjacent to the substrate). Adhesion is rated on a 0-5 scale (5=100% adhesion, 0=0% adhesion). For purposes of the present invention, the adhesion of a coating is "improved" relative to another coating if adhesion rating is higher than the coating to which it is being compared. As a result, the present invention is also directed to methods for improving the adhesion and abrasion resistance of a coating composition, the method comprising including in the coating composition a silica sol comprising silica nanoparticles and a polymerizable (meth)acrylate binding agent, wherein the polymerizable (meth)acrylate binding agent remains substantially uncrosslinked after the coating composition has been cured to form a hard coat.

As will be apparent from the foregoing description, the present invention is also directed to an article at least partially coated with a hard coat deposited from a coating composition comprising: (a) an alkoxide of the general formula $R_xM(OR')_{z-x}$ where R is an organic radical, M is silicon, aluminum, titanium, and/or zirconium, each R' is independently an alkyl radical, z is the valence of M, and x is a number less than z and may be zero; and (b) a silica sol comprising silica nanoparticles and a polymerizable (meth)acrylate binding agent, wherein the polymerizable (meth)acrylate binding agent is substantially uncrosslinked.

The present invention is also directed to methods for depositing a hard coat on at least a portion of a plastic substrate. These methods comprise: (a) at least partially hydrolyzing an alkoxide of the general formula $R_xM(OR')_{z-x}$ where R is an organic radical, M is silicon, aluminum, titanium, and/or zirconium, each R' is independently an alkyl radical, z is the valence of M, and x is a number less than z and may be zero; (b) adding a silica sol comprising silica nanoparticles and a polymerizable (meth)acrylate binding agent to the at least partially hydrolyzed alkoxide to form a coating composition; (c) depositing the coating composition on at least a portion of the substrate; and (d) curing the coating composition, wherein the polymerizable (meth)acrylate binding agent remains substantially uncrosslinked after the curing step. In certain embodiments, such methods do not include the step of applying a primer before applying the coating composition.

Illustrating the invention are the following examples, which, however, are not to be considered as limiting the invention to their details. Unless otherwise indicated, all parts and percentages in the following examples, as well as throughout the specification, are by weight.

EXAMPLES

Example 1

Preparation of Coating Composition

Diluted nitric acid solution was prepared by mixing 1.05 grams of 70% nitric acid with 7000.00 grams of DI water.

In a clean reaction vessel, 326.4 grams of glycidoxypropyltrimethoxysilane and 186.0 grams of tetramethyl orthosilicate were mixed. The contents were cooled with an ice/water bath. When the temperature of the silane mixture in the reaction vessel reached to between 10-15° C., 80.5 grams of pre-diluted nitric acid solution was rapidly added with stirring to the reaction vessel. Increased temperature was observed as the result of the exothermal reaction. The ice/water bath kept the maximum reaction temperature between 15-20° C. The maximum temperature was reached 5-10 minutes after the addition of the acid solution. After the maximum temperature was reached, additional 80.5 grams of pre-diluted nitric acid solution was added into the reaction vessel under stirring. The maximum temperature was reached 5-10 minutes after the second charge of the acid solution. The ice/water bath should keep the maximum reaction temperature between 20-25° C. After the maximum temperature was reached, the water bath was removed and the reaction vessel was stirred at room temperature for 3 hours. After this time, the pH of the mixture was between 1.9-2.0. The pH was then adjusted to 5.5 by slowly adding a few drops of 25% tetramethylammonium hydroxide solution in methanol into the reaction vessel. After pH adjustment, 264.5 grams of Dowanol® PM, 1.2 grams of BYK-306 and 12.1 grams of 50% triarylsulfonium hexafluorophosphate salts solution in propylene carbonate as cationic photo-initiator were added into the reaction vessel, and the reaction mixture was stirred for 10-20 minutes at room temperature.

In a separate container, 42.40 grams of Nanocryl® 140, 42.40 grams of Dowanol® PM and 590.00 grams of diacetone alcohol were mixed. This mixture was then added into the reaction vessel, and the reaction mixture was stirred for additional 30 minutes at room temperature. The coating solution was then filtered through a 0.45 micron nominal capsule filter in a single pass.

Example 2

Mokrolon® transparent polycarbonate substrate (Bayer AG) was rinsed and wiped with 2-propanol. Coatings were spin applied on un-primed substrate and cured with D bulb with UVA dosage of 6-8 J/cm² under air. The final dry film thickness was 3-5 μm. Coated samples were evaluated for optical appearance, adhesion and taber abrasion resistance.

As demonstrated in Table 1, the coating without the silica sol did not provide acceptable adhesion. The coatings with the silica sol provided excellent adhesion and abrasion resistant. The coating with silica sol and a free radical initiator did not provide acceptable adhesion. Without acceptable adhesion, coatings do not exhibit abrasion resistance.

TABLE 1

| Component (%)[1] | Sample 1 | Sample 2 | Sample 3 | Sample 4 |
|---|---|---|---|---|
| Nanoparticle/diacrylate dispersion[2] | 0 | 5 | 15 | 15 |
| Darocur 4265[3] | 0 | 0 | 0 | 2 |
| Testing | Results | | | |
| Appearance[4] | Clear | Clear | Clear | Clear |
| Initial transmission (%)[5] | 87 | 87 | 87 | 85 |
| Adhesion[6] | 0 | 5 | 5 | 4 |
| Haze % after 300 cycles of Taber Abrasion[7] | 37 | 3.5 | 4.4 | 22.9 |
| Haze % after 500 cycles of Taber Abrasion[8] | — | 4.6 | 4.4 | — |
| Abrasion resistance[9] | fail | pass | pass | fail |

[1]Weight based on hardcoat total solid.
[2]Nanocryl 140, commercially available from Hanse Chemie.
[3]A free radical photo-initiator, commercially available from Ciba Specialty Chemicals Corporation.
[4]Coating appearance was evaluated after UV cure.
[5]Initial transmission was measured with Hunter Lab spectrophotometer.
[6]Adhesion: Crosshatch, Nichibon LP-24 adhesive tape. Rating scale 0-5 (no adhesion - 100% adhesion after tape pull).
[7]Taber Abrasion: Taber 5150 Abrader, CS-10 wheels, 500 grams of weight. Haze % was measured after 300 taber cycles.
[8]If haze is <7% after 300 taber cycles, sample was run for additional 200 abrasion cycles completing a total of 500 abrasion cycles.
[9]Requirement for abrasion resistant is <7% of haze after 300 taber cycle.

It will be readily appreciated by those skilled in the art that modifications may be made to the invention without departing from the concepts disclosed in the foregoing description. Such modifications are to be considered as included within the following claims unless the claims, by their language, expressly state otherwise. Accordingly, the particular embodiments described in detail herein are illustrative only and are not limiting to the scope of the invention which is to be given the full breadth of the appended claims and any and all equivalents thereof.

We claim:

1. A coating composition comprising:
   (a) at least one alkoxide of the formula $R_xM(OR')_{z-x}$ where R is an organic radical, M is silicon, aluminum, titanium, and/or zirconium, each R' is independently an alkyl radical, z is the valence of M, and x is a number less than z and may be zero; and
   (b) a silica sol comprising silica nanoparticles and a polymerizable (meth)acrylate binding agent,
   wherein the polymerizable (meth)acrylate binding agent remains substantially uncrosslinked after the coating composition has been cured to form a hard coat.

2. The coating composition of claim 1, wherein the alkoxide comprises a combination of a glycidoxy[($C_1$-$C_3$)alkyl]tri($C_1$-$C_4$alkoxysilane monomer and a tetra($C_1$-$C_6$)alkoxysilane monomer.

3. The coating composition of claim 2, wherein the glycidoxy[($C_1$-$C_3$)alkyl]tri($C_1$-$C_4$alkoxysilane monomer comprises γ-glycidoxypropyltrimethoxysilane.

4. The coating composition of claim 2, wherein the tetra($C_1$-$C_6$)alkoxysilane monomer comprises tetramethoxysilane and/or tetraethoxysilane.

5. The coating composition of claim 1, wherein the silica nanoparticles have an average primary particle size of 100 nanometers or less.

6. The coating composition of claim 1, wherein the polymerizable (meth)acrylate binding agent comprises hexanedioldiacrylate.

7. The coating composition of claim 1, further comprising a catalyst.

8. The coating composition of claim 7, wherein the catalyst comprises an acidic material and/or a material that generates an acid upon exposure to actinic radiation.

9. The coating composition of claim 8, wherein the material that generates an acid upon exposure to actinic radiation comprises a cationic photoinitiator.

10. The coating composition of claim 1, wherein the composition is comprises no more than 1 percent by weight of free radical polymerization initiator.

* * * * *

UNITED STATES PATENT AND TRADEMARK OFFICE
CERTIFICATE OF CORRECTION

| | | |
|---|---|---|
| PATENT NO. | : 7,723,404 B2 | |
| APPLICATION NO. | : 11/399146 | |
| DATED | : May 25, 2010 | |
| INVENTOR(S) | : Shan Cheng and James P. Colton | |

It is certified that error appears in the above-identified patent and that said Letters Patent is hereby corrected as shown below:

Column 12, Line 2 (Claim 10)
After "...wherein the composition..." delete "is"

Signed and Sealed this
Twenty-fourth Day of January, 2012

David J. Kappos
*Director of the United States Patent and Trademark Office*